(12) United States Patent
Bhattad et al.

(10) Patent No.: US 9,148,204 B2
(45) Date of Patent: Sep. 29, 2015

(54) PHYSICAL RESOURCE BLOCK (PRB) BUNDLING FOR OPEN LOOP BEAMFORMING

(75) Inventors: Kapil Bhattad, San Diego, CA (US); Peter Gaal, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 840 days.

(21) Appl. No.: 13/164,551

(22) Filed: Jun. 20, 2011

(65) Prior Publication Data

US 2011/0310831 A1    Dec. 22, 2011

Related U.S. Application Data

(60) Provisional application No. 61/357,005, filed on Jun. 21, 2010.

(51) Int. Cl.
*H04B 7/04* (2006.01)
*H04L 25/02* (2006.01)
*H04L 5/00* (2006.01)

(52) U.S. Cl.
CPC ............ *H04B 7/0413* (2013.01); *H04L 5/0044* (2013.01); *H04L 25/0208* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 7,991,004 B2 * | 8/2011 | Nishio et al. | 370/468 |
| 8,072,899 B2 * | 12/2011 | Pan et al. | 370/252 |
| 8,160,016 B2 * | 4/2012 | Papasakellariou et al. | 370/329 |
| 8,179,849 B2 * | 5/2012 | Callard et al. | 370/329 |
| 8,223,646 B2 * | 7/2012 | Cai et al. | 370/235 |
| 8,260,356 B2 * | 9/2012 | Nam et al. | 455/561 |
| 8,275,063 B2 * | 9/2012 | Kim et al. | 375/267 |
| 8,284,732 B2 * | 10/2012 | Nimbalker et al. | 370/330 |
| 8,295,193 B2 * | 10/2012 | Ko et al. | 370/252 |
| 8,335,205 B2 * | 12/2012 | Ray et al. | 370/349 |
| 8,467,469 B2 * | 6/2013 | Lee et al. | 375/267 |
| 8,509,171 B2 * | 8/2013 | Moulsley et al. | 370/329 |
| 8,537,790 B2 * | 9/2013 | Cudak et al. | 370/337 |

(Continued)

FOREIGN PATENT DOCUMENTS

| | | |
|---|---|---|
| CN | 101189805 A | 5/2008 |
| CN | 101569127 A | 10/2009 |

(Continued)

OTHER PUBLICATIONS

3GPP TS 36.213 V8.4.0 (Sep. 2008). 3rd Generation Partnership Project; Technical Specification Group Radio Access Network; Evolved Universal Terrestrial Radio Access (E-UTRA); Physical layer procedures (release 8). 60 pages total.*

(Continued)

*Primary Examiner* — Ayaz Sheikh
*Assistant Examiner* — Faiyazkhan Ghafoerkhan
(74) *Attorney, Agent, or Firm* — Seyfarth Shaw LLP

(57) ABSTRACT

Provided is a method for wireless communication which includes determining a data allocation size available for data to be transmitted, determining a bundling size based at least in part on the data allocation size, and precoding at least one reference signal in bundled contiguous resource blocks of the determined bundling size. The at least one reference signal in resource blocks in each bundle are precoded with a common precoding matrix.

34 Claims, 6 Drawing Sheets

(56) References Cited

U.S. PATENT DOCUMENTS

| | | | | |
|---|---|---|---|---|
| 8,588,084 | B2* | 11/2013 | Tirkkonen et al. | 370/252 |
| 8,606,287 | B2* | 12/2013 | Landau et al. | 455/452.1 |
| 8,625,632 | B2* | 1/2014 | Roman et al. | 370/468 |
| 2003/0072285 | A1 | 4/2003 | Onggosanusi et al. | |
| 2005/0208973 | A1* | 9/2005 | Iochi | 455/561 |
| 2006/0193275 | A1* | 8/2006 | Umesh et al. | 370/310 |
| 2006/0293008 | A1* | 12/2006 | Hiraki et al. | 455/226.4 |
| 2008/0013610 | A1* | 1/2008 | Varadarajan et al. | 375/221 |
| 2008/0139216 | A1* | 6/2008 | Lee et al. | 455/452.2 |
| 2008/0165836 | A1* | 7/2008 | Landau et al. | 375/221 |
| 2008/0212701 | A1* | 9/2008 | Pan et al. | 375/260 |
| 2008/0232492 | A1* | 9/2008 | Xiao et al. | 375/260 |
| 2008/0246887 | A1* | 10/2008 | Lee et al. | 348/726 |
| 2008/0260059 | A1* | 10/2008 | Pan | 375/260 |
| 2008/0282130 | A1* | 11/2008 | Lee et al. | 714/758 |
| 2008/0313692 | A1* | 12/2008 | Yun et al. | 725/131 |
| 2009/0175230 | A1* | 7/2009 | Callard et al. | 370/329 |
| 2009/0225721 | A1* | 9/2009 | Cudak et al. | 370/330 |
| 2009/0238298 | A1* | 9/2009 | Kim et al. | 375/267 |
| 2009/0259910 | A1* | 10/2009 | Lee et al. | 714/748 |
| 2009/0268707 | A1* | 10/2009 | Pani et al. | 370/345 |
| 2009/0323849 | A1* | 12/2009 | Bala et al. | 375/267 |
| 2009/0325585 | A1* | 12/2009 | Farajidana et al. | 455/450 |
| 2010/0002598 | A1* | 1/2010 | Pan et al. | 370/252 |
| 2010/0034162 | A1* | 2/2010 | Ou et al. | 370/329 |
| 2010/0074130 | A1* | 3/2010 | Bertrand et al. | 370/252 |
| 2010/0075691 | A1* | 3/2010 | Cai et al. | 455/452.1 |
| 2010/0097949 | A1* | 4/2010 | Ko et al. | 370/252 |
| 2010/0135242 | A1* | 6/2010 | Nam et al. | 370/330 |
| 2010/0195614 | A1* | 8/2010 | Nimbalker et al. | 370/330 |
| 2010/0232384 | A1* | 9/2010 | Farajidana et al. | 370/329 |
| 2010/0303034 | A1* | 12/2010 | Chen et al. | 370/329 |
| 2010/0323709 | A1* | 12/2010 | Nam et al. | 455/450 |
| 2011/0044277 | A1* | 2/2011 | Moulsley et al. | 370/329 |
| 2011/0085508 | A1* | 4/2011 | Wengerter et al. | 370/329 |
| 2011/0205995 | A1* | 8/2011 | Grovlen | 370/329 |
| 2011/0305211 | A1* | 12/2011 | Lunttila et al. | 370/329 |
| 2012/0014347 | A1* | 1/2012 | Tanaka | 370/329 |

FOREIGN PATENT DOCUMENTS

| | | |
|---|---|---|
| EP | 2343850 A2 | 7/2011 |
| JP | 2012004609 A | 1/2012 |
| WO | WO2010105229 | 9/2010 |

OTHER PUBLICATIONS

Zyren, Jim, "Overview of the 3GPP Long Term Evolution Physical Layer", Jul. 2007.*

International Search Report and Written Opinion—PCT/US2011/041304, International Search Authority—European Patent Office—Sep. 21, 2011.

Qualcomm Europe: "UE-RS Patterns for ranks 5 to 8 of LTE-A", 3GPP Draft, R1-094212 UE RS Patterns for Rank 5-8, 3rd Generation Partnership Project (3GPP), Mobile Competence Centre, 650, Route Des Lucioles, F-06921 Sophia-Antipolis Cedex, France, No. Miyazaki, Oct. 12, 2009, XP050388682, [retrieved on Oct. 7, 2009].

Research in Motion et al: "Further Discussion on Signaling of DM-RS Port for LTE-A MIMO Transmission", 3GPP Draft; R1-100564(RIM-Signaling DM-RS-Ports for LIE-A MIMO), 3rd Generation Partnership Project (SGPP), Mobile Competence Centre ; 650, Route Des Lucioles ; F-06921 Sophia-Antipolis Ceoex : France. vol. Ran WG1, No. Valencia, Spain; Jan. 18, 2010, Jan. 12, 2010, XPO50418182.

Samsung: "Discussion on DM-RS for LTE-i Advanced", 3GPP Draft;R1-094088 DM Rs Designs in LIE-A, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050388565.

Motorola: "RV for UL Subframe Bundling," TSG-RAN WG1 #52bis, R1-081304, Shenzhen, China, Mar. 31-Apr. 4, 2008, 2 pages.

Nokia et al., "Considerations on the CCE sharing for uplink and downlink allocation grants", 3GPP TSG RAN WG1 Meeting #51bis, R1-080302, Jan. 14-18, 2008, 2 Pages.

* cited by examiner

PHYSICAL RESOURCE BLOCK (PRB) BUNDLING FOR OPEN LOOP BEAMFORMING

CROSS-REFERENCE TO RELATED APPLICATIONS

This application claims priority to U.S. Provisional Application Ser. No. 61/357,005, filed on Jun. 21, 2010, which is expressly incorporated by reference herein in its entirety.

BACKGROUND

I. Field

Certain aspects of the present disclosure generally relate to wireless communications and, more particularly, to resource block bundling in wireless communications.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

SUMMARY

Certain aspects of the present disclosure provide a method for wireless communication. The method includes determining a data allocation size available for data to be transmitted, determining a bundling size based at least in part on the data allocation size, and precoding at least one reference signal in bundled contiguous resource blocks of the determined bundling size. The at least one reference signal in resource blocks in each bundle are precoded with a common precoding matrix.

Certain aspects of the present disclosure provide an apparatus for wireless communications. The apparatus includes means for determining a data allocation size available for data to be transmitted, means for determining a bundling size based at least in part on the data allocation size, and means for precoding at least one reference signal in bundled contiguous resource blocks of the determined bundling size. The at least one reference signal in resource blocks in each bundle are precoded with a common precoding matrix.

Certain aspects of the present disclosure provide a computer-program product for wireless communications, comprising a non-transitory computer readable medium having instructions stored thereon, the instructions being executable by a processor and the instructions include instructions for determining a data allocation size available for data to be transmitted, instructions for determining a bundling size based at least in part on the data allocation size, and instructions for precoding at least one reference signal in bundled contiguous resource blocks of the determined bundling size. The at least one reference signal in resource blocks in each bundle are precoded with a common precoding matrix.

Certain aspects of the present disclosure provide an apparatus for wireless communications. The apparatus includes at least one processor configured to determine a data allocation size available for data to be transmitted, to determine a bundling size based at least in part on the data allocation size, and to precode at least one reference signal in bundled contiguous resource blocks of the determined bundling size. The at least one reference signal in resource blocks in each bundle are precoded with a common precoding matrix. The apparatus further includes a memory coupled to the at least one processor.

Certain aspects of the present disclosure provide a method for wireless communication. The method includes determining a bundling size based on a data allocation size of received data transmitted from a base station in bundles of contiguous resource blocks, wherein at least one reference signal in resource blocks in each bundle are precoded with a common precoding matrix, and estimating at least one precoded channel based on the determined bundling size and one or more reference signals transmitted from the base station.

Certain aspects of the present disclosure provide an apparatus for wireless communications. The apparatus includes means for determining a bundling size based on a data allocation size of received data transmitted from a base station in bundles of contiguous resource blocks, wherein at least one reference signal in resource blocks in each bundle are precoded with a common precoding matrix, and means for estimating at least one precoded channel based on the determined bundling size and one or more reference signals transmitted from the base station.

Certain aspects of the present disclosure provide a computer-program product for wireless communications, comprising a computer readable medium having instructions stored thereon, the instructions being executable by a processor and the instructions include instructions for determining a bundling size based on a data allocation size of received data transmitted from a base station in bundles of contiguous resource blocks, wherein at least one reference signal in resource blocks in each bundle are precoded with a common precoding matrix, and instructions for estimating at least one precoded channel based on the determined bundling size and one or more reference signals transmitted from the base station.

Certain aspects of the present disclosure provide an apparatus for wireless communications. The apparatus includes at least one processor configured to determine a bundling size based on a data allocation size of received data transmitted from a base station in bundles of contiguous resource blocks, wherein at least one reference signal in resource blocks in each bundle are precoded with a common precoding matrix, and to estimate at least one precoded channel based on the determined bundling size and one or more reference signals transmitted from the base station. The apparatus further includes a memory coupled to the at least one processor.

DETAILED DESCRIPTION

In some cases physical resource blocks (PRBs) may be bundled, with a common precoder matrix used across all RBs in a bundle. As a result, PRB bundling may enable a UE to estimate the precoded channel jointly across RBs and improve channel estimation performance. For high speed UEs, open loop schemes may be used, in which precoder cycling is employed where several different (e.g., randomly selected) precoders are used for the data allocated to the UE. This precoder cycling may be utilized in an effort to sweep many different directions to make the precoded channel appear ergodic. However, for small data allocation sizes, reductions in the number of precoders may offset the gains in channel estimation performance achieved by PRB bundling.

Certain aspects of the present disclosure provide techniques that may be utilized to help optimize downlink transmissions by making bundling of physical resource blocks (PRBs) dependent on data allocation size. According to certain aspects, bundling may be enabled and disabled based on data allocation size. As an alternative, or in addition, actual bundling size may be dependent on data allocation size. As a result, bundling may be utilized when a sufficient number of precoders is used for the data allocation. For small data allocation sizes, bundling may be disabled as only a small number of precoders would be used due to the small number of corresponding bundles.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP LTE and LTE-Advanced (LTE-A), in both frequency division duplexing (FDD) and time division duplexing (TDD), are releases of UMTS that use E-UTRA, which employs OFDMA on the downlink and SC-FDMA on the uplink. UTRA, E-UTRA, UMTS, LTE, LTE-A and GSM are described in documents from 3GPP. cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
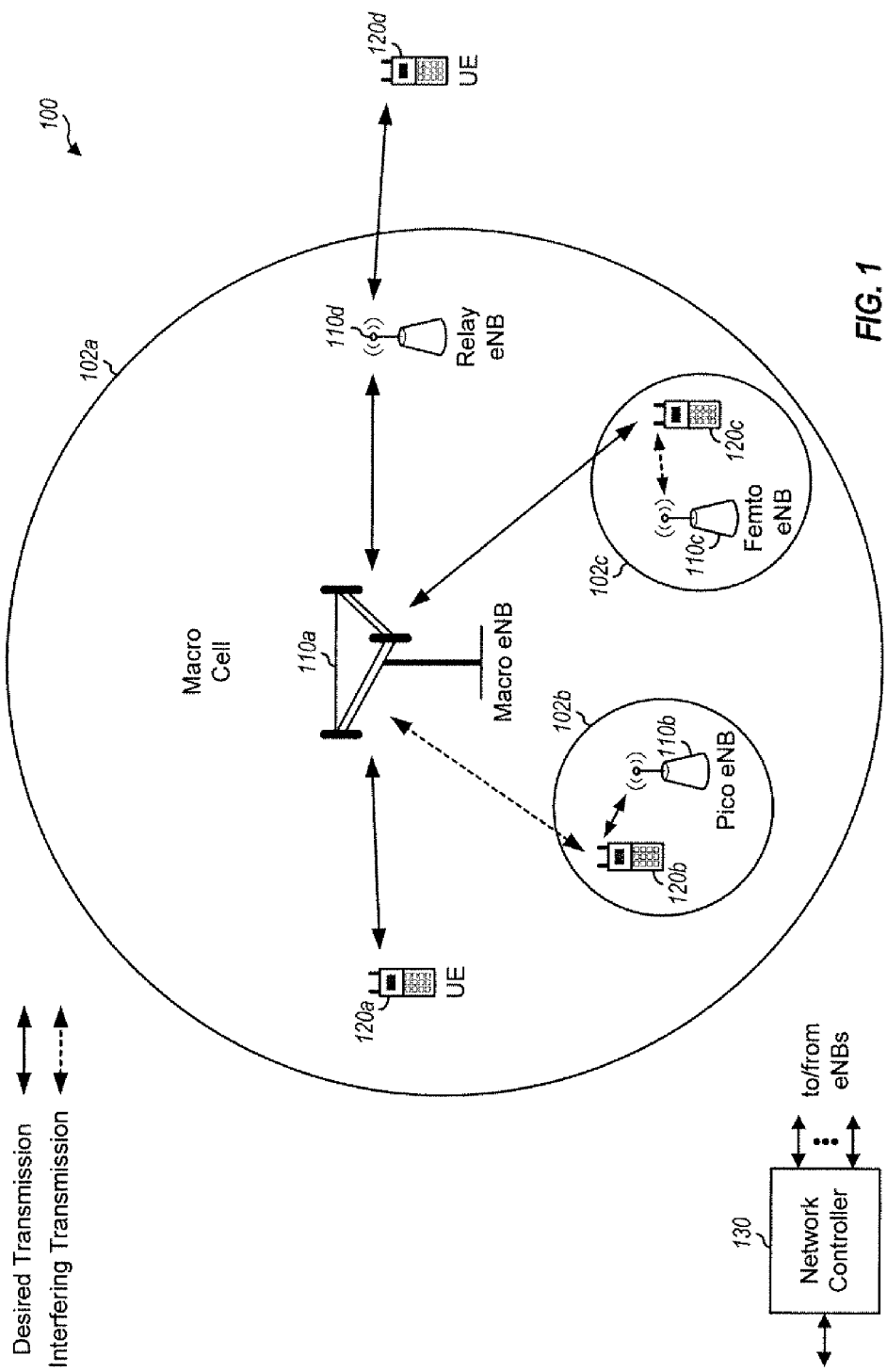
FIG. 1 illustrates a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB," "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, mobile device, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

Figure 2:
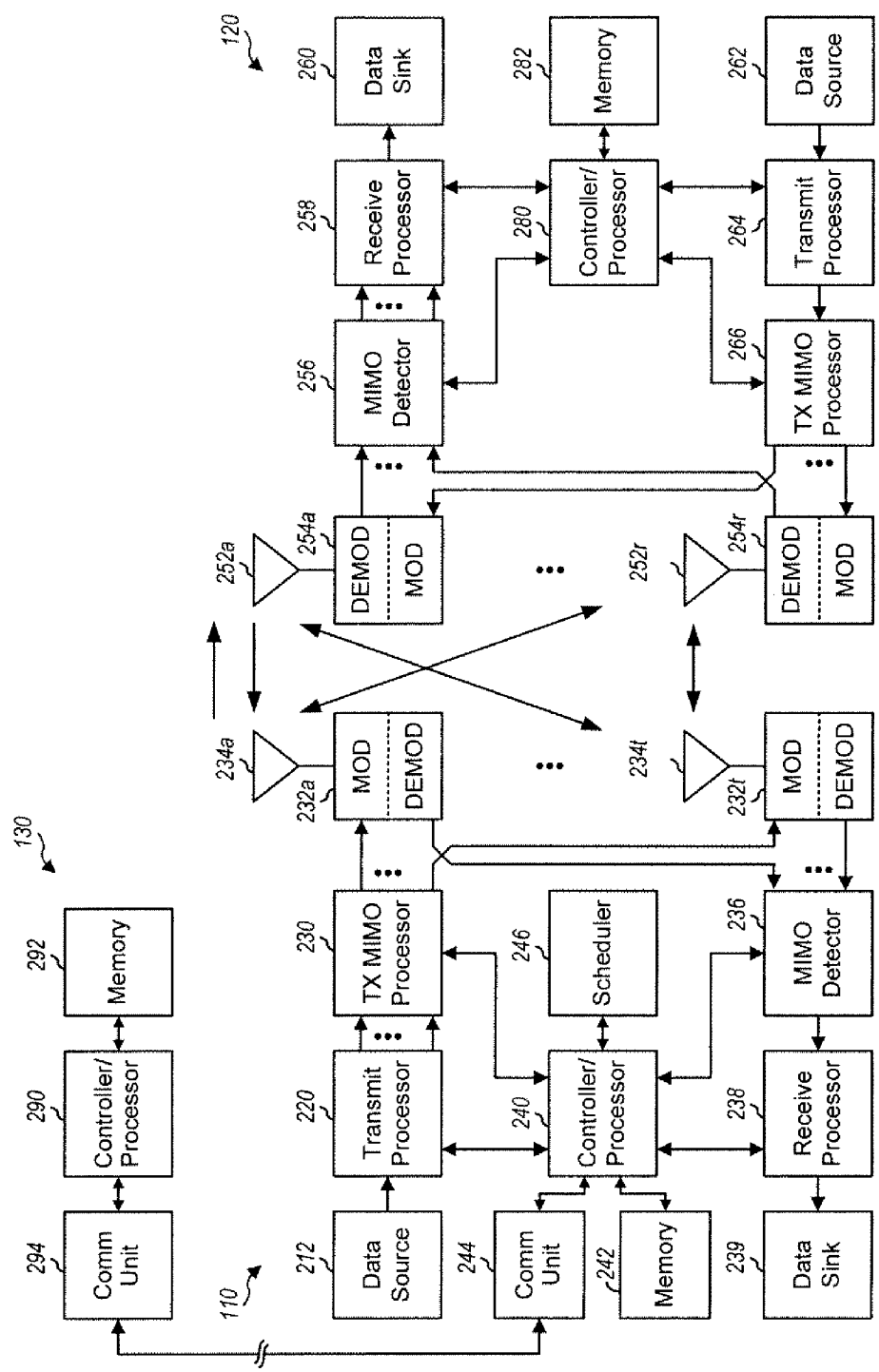
FIG. 2 illustrates a block diagram of a base station and a user equipment (UE).

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine reference signal received power (RSRP), received signal strength indicator (RSSI), reference signal received quality (RSRQ), CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations 600 of FIG. 6 and/or other processes for the techniques described herein. Memories 242 and 282 may store data and program codes for base station 110 and UE 120, respectively. A scheduler 244 may schedule UEs for data transmission on the downlink and/or uplink.

As will be described in further detail below, when transmitting data to the UE 120 the base station 110 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
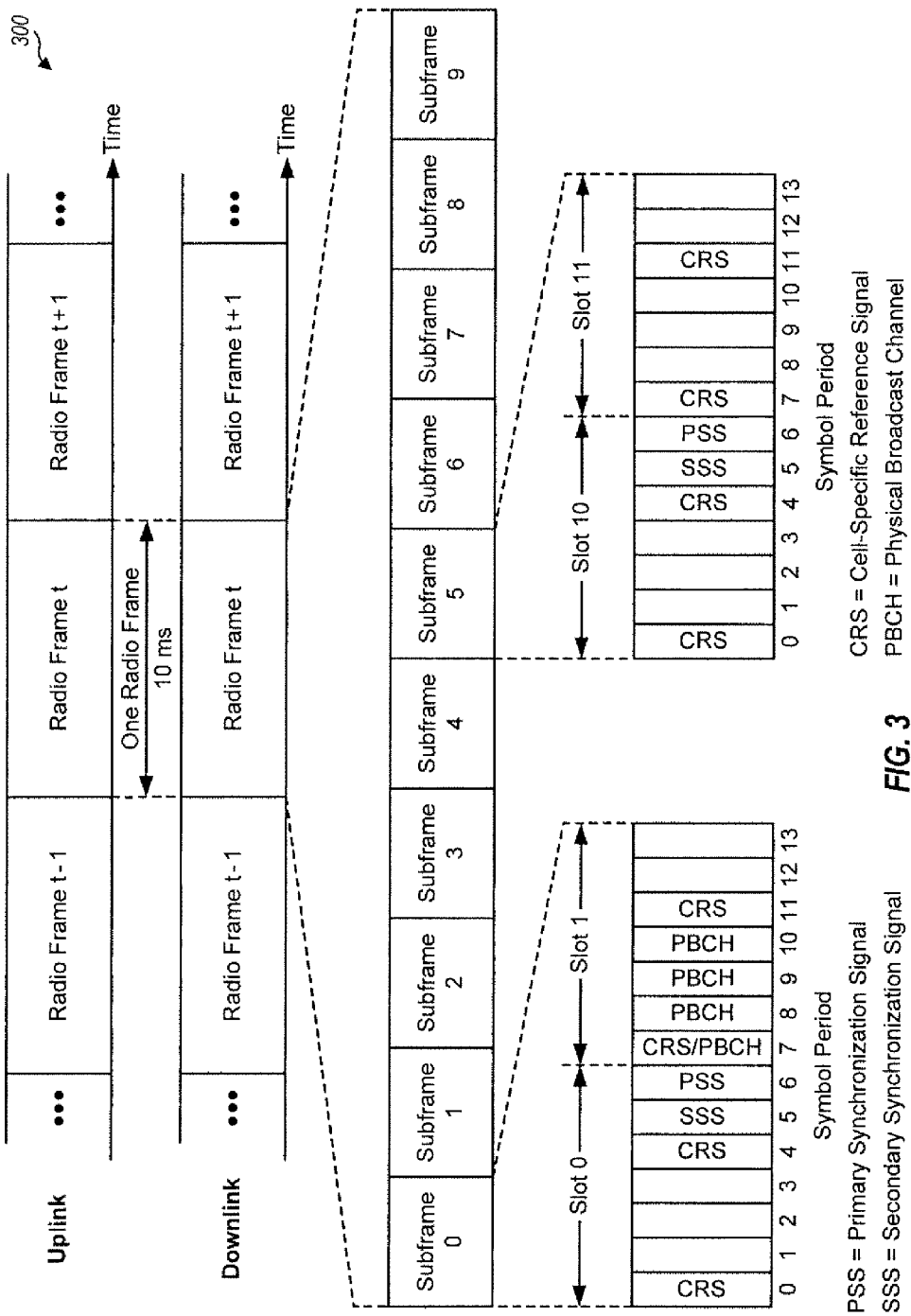
FIG. 3 illustrates a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
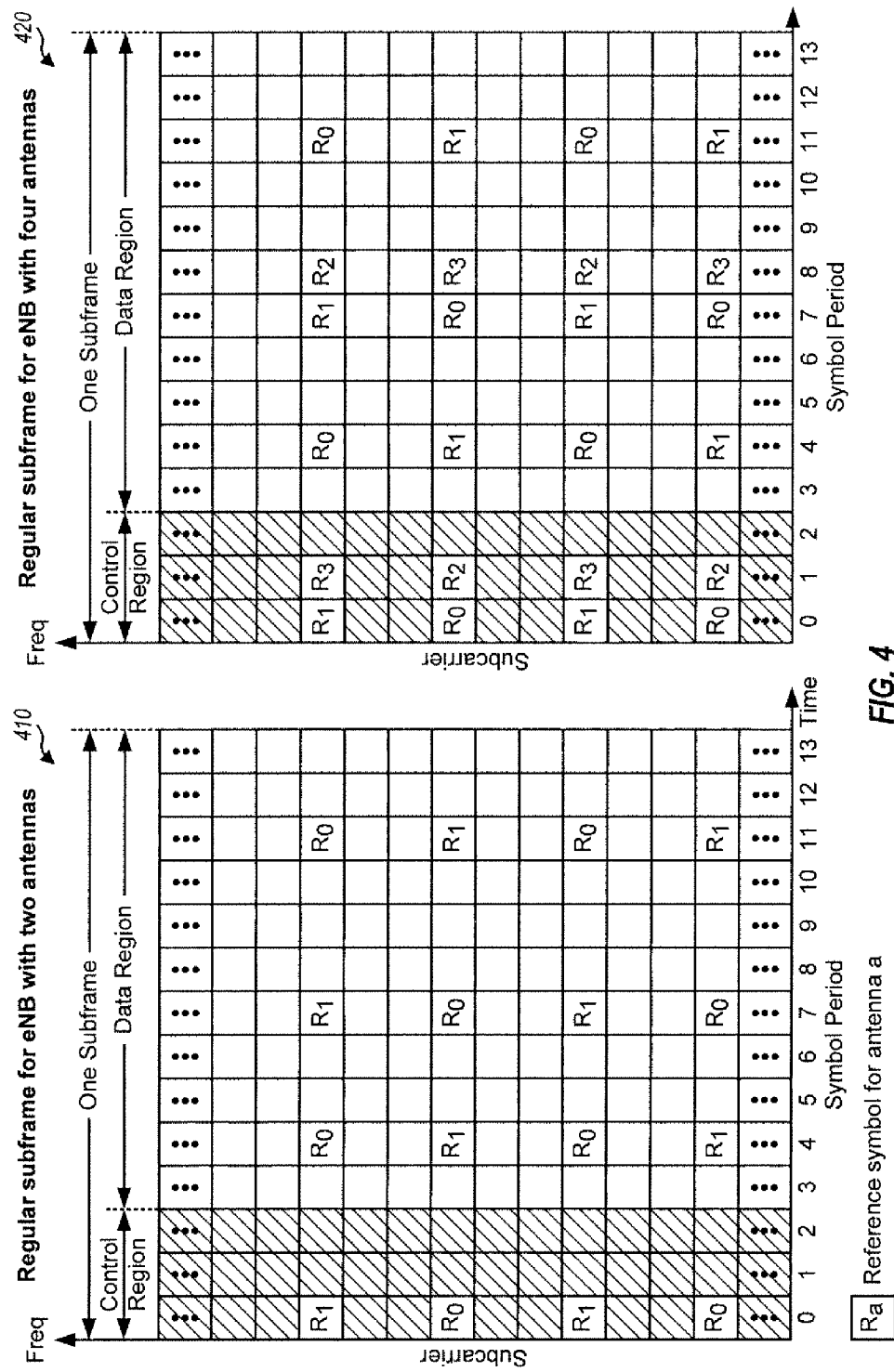
FIG. 4 illustrates exemplary subframe formats for the downlink.

FIG. 4 shows two exemplary subframe formats 410 and 420 for the downlink with normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a RSRQ, or some other metric. The UE may operate in a dominant interference scenario in which the UE may observe high interference from one or more interfering eNBs.

As noted above, PRB bundling typically utilizes a same precoder (or precoding matrix) across contiguous resource blocks (RBs). A bundling size may indicate the number of RBs to be processed in a similar manner, e.g., to be precoded based on the same precoding matrix. Bundling in this manner may enable UEs to estimate the precoded channel jointly across RBs, which may improve channel estimation performance.

For low speed UEs, the precoding matrices are typically selected in a "closed-loop" manner, based on feedback from the UE and used before the channel has changed significantly. For high speed UEs, "open loop" schemes that do not require UE feedback are often used, such as precoder cycling where several different (e.g., randomly selected) precoders are used for the data allocated to the UE. The goal of precoder cycling may be to sweep across many different directions to make the channel appear ergodic (and to avoid poor performance if a precoding matrix is used that does not match the actual channel conditions).

In UE-specific reference signal (UE-RS) based transmission without bundling, since the precoded channel is estimated at the UE per RB, the same precoder may be used within each RB, while different precoders may be used across different RBs allowing for a number of different precoders, depending on the data allocation size. As an example, if a UE is allocated 4 RBs for data transmission, the eNB may use 4 different precoders.

As noted above, when bundling is enabled, the same precoder may be used across the bundled RBs, thus reducing the total number of precoders used for an allocated amount of data. For example, if a bundling size is 2 RBs, only 2 precoders may be used for a 4 RB data allocation. Unfortunately, this reduction in the number of precoders used may result in transmission across fewer directions, which may more than offset the gain in channel estimation performance due to bundling, especially for small data allocations.

For large data allocations, on the other hand, such as 24 RBs, the number of precoders used with no bundling is 24 and with a bundling size of 2 RB, the number of precoders is still 12, which may still be considered sufficient. Thus, due to the relatively high number of precoders still used, the loss due to non-ergodicity of the channel from 24 precoders to 12 precoders is typically much smaller as compared to when going from 4 precoders to 2 precoders.

According to certain aspects, bundling size may be determined as a function of data allocation size. In some cases, bundling may be disabled for small data allocation sizes, for example, by specifying a bundling size of 1. For such small data allocations, it may be beneficial to not have bundling at all since the gain in channel estimation due to bundling may be more than offset by the use of fewer precoders. For larger data allocations, however, bundling may be beneficial.

Figure 5:
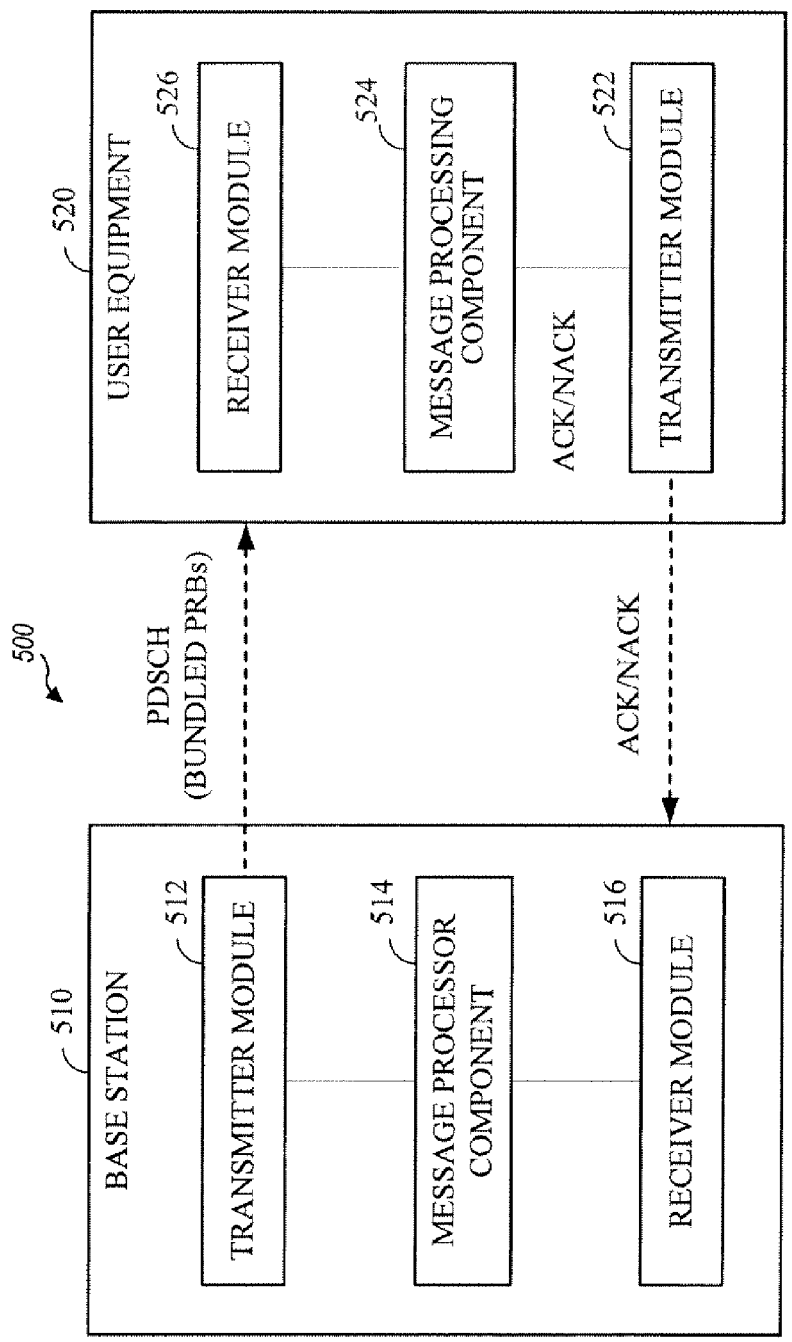
FIG. 5 illustrates an exemplary base station and UE.

FIG. 5 illustrates an example wireless system 500 with a base station (or eNB) 510 and UE 520 capable of operating in accordance with certain aspects of the present disclosure.

According to certain aspects, the base station 510 may determine a bundling size to use for data transmission to a UE 520 using UE specific reference signals (UE-RS). The data transmissions and UE-RS may be transmitted in a PDSCH message generated by a message processor component 514.

The UE-RS may be precoded using a same precoder (precoding matrix) as used for the data. The UE does not need to know the precoding matrix, since it can estimate the precoded channel directly from the UE-RS, but it may need to know the bundling size (because this is the size over which the same precoder is used) in order to obtain improved channel estimates. According to certain aspects, the base station 510 may signal a data allocation size to the UE 520 (e.g., via a downlink grant) and the UE may determine the bundling size therefrom.

As illustrated, the UE 520 may receive the data transmission and UE-RS via a receiver module 526. A message processing component 524 may process the message and, if successfully decoded, generate an acknowledgement message, to be transmitted to the base station 510, via a transmitter module 522. The base station may receive the acknowledgement message, via a receiver module 516.

Figures 6, 7:
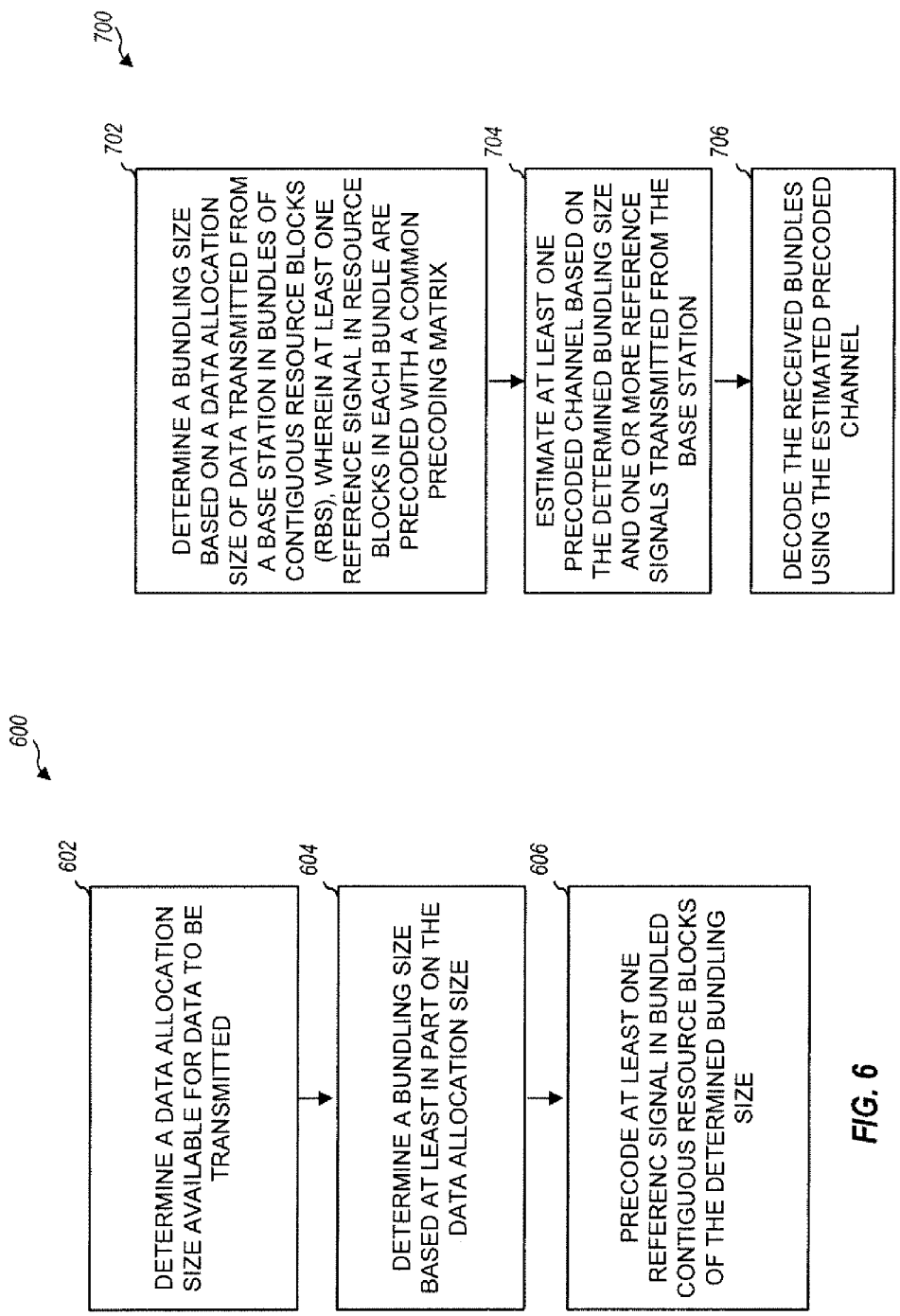
FIG. 6 illustrates example operations that may be performed by a base station, in accordance with certain aspects of the present disclosure.
FIG. 7 illustrates example operations that may be performed by a UE, in accordance with certain aspects of the present disclosure.

As noted above, the base station 510 may enable/disable and/or determine bundling size based on the data allocation size. FIG. 6 illustrates example operations 600 that may be performed, for example, at base station 510 of FIG. 5, for bundling resource blocks in accordance with certain aspects of the present disclosure.

The operations 600 begin, at 602, by determining a data allocation size available for data to be transmitted. At 604, a bundling size is determined based at least in part on the data allocation size. At, 606 UE-RS in bundled contiguous resource blocks of the determined bundling size is precoded. The UE-RS in resource blocks in each bundle are precoded with a common precoding matrix. According to some transmission schemes, the data in the bundled contiguous resource blocks may also be precoded using the same precoding matrix as the UE-RS. For other transmission schemes, the precoder used for data may be different from that used for UE-RS.

According to certain aspects, the bundling size may also be a function of one or more other parameters, such as the channel properties (e.g., delay spread), number of transmit (Tx) and receive (Rx) antennas, a current transmission rank, and/or a current transmission mode (e.g., open loop or closed loop).

FIG. 7 illustrates example operations 700 that may be performed, for example, at UE 520 of FIG. 5, for processing bundled resource blocks in accordance with certain aspects of the present disclosure.

The operations 700 begin, at 702, by determining a bundling size based on a data allocation size of received data transmitted from a base station in bundles of contiguous resource blocks (RBs). The reference signal in resource blocks in each bundle may be precoded with a common precoding matrix. According to some transmission schemes, the data in the bundled contiguous resource blocks may also be precoded using the same precoding matrix as the reference signal. For other transmission schemes, the precoder used for data may be different from that used for reference signal. The UE may know the data allocation size (e.g., from a downlink grant) and, thus, may also be able to determine bundling size for use in jointly estimating one or more precoded channels across bundled RBs.

At 704, one or more precoded channels are estimated based on the determined bundling size and one or more reference signals (RSs) transmitted from the base station. At 706, the UE decodes received bundles using the estimated channel. The operations 700 may be repeated for each transmission, with the particular bundling size determined each time based on the allocated data size.

The techniques presented herein may be utilized to help optimize downlink transmissions by making bundling of physical resource blocks (PRBs) dependent on data allocation size. As described, bundling may be enabled and disabled (and/or bundling size determined) based on data allocation size. In this manner, bundling may be utilized when a sufficient number of precoders is used for the data allocation while, for small data allocation sizes, bundling may be disabled (e.g., bundling=1), as only a small number of precoders would be used due to the small number of corresponding bundles.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in the figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a terminal. In the alternative, the processor and the storage medium may reside as discrete components in a terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining, at a base station, a data allocation size from a data region of at least one subframe for a data transmission to a user equipment (UE);
   signaling the data allocation size to the UE in a downlink assignment;
   determining a bundling size based at least in part on the data allocation size and a delay spread; and
   precoding at least one reference signal in bundled contiguous resource blocks of the determined bundling size, wherein the at least one reference signal in each bundle is precoded with a common precoding matrix.

2. The method of claim 1, wherein data in each resource block uses the same precoder as the at least one reference signal.

3. The method of claim 1, wherein the determining the bundling size further includes determining the bundling size based at least in part on one of a number of transmit antennas and a number of receive antennas.

4. The method of claim 1, wherein the determining the bundling size further includes determining the bundling size based at least in part on a current transmission rank.

5. The method of claim 1, wherein the determining the bundling size further includes determining the bundling size based at least in part on a transmission mode.

6. The method of claim 5, wherein the transmission mode includes one of an open-loop transmission mode and a closed-loop transmission mode.

7. An apparatus for wireless communication, comprising:
   means for determining, at a base station, a data allocation size from a data region of at least one subframe for a data transmission to a user equipment (UE);
   means for signaling the data allocation size to the UE in a downlink assignment;
   means for determining a bundling size based at least in part on the data allocation size and a delay spread; and
   means for precoding at least one reference signal in bundled contiguous resource blocks of the determined bundling size, wherein the at least one reference signal in each bundle is precoded with a common precoding matrix.

8. The apparatus of claim 7, wherein data in each resource block uses the same precoder as the at least one reference signal.

9. The apparatus of claim 7, wherein the means for determining the bundling size further includes means for determining the bundling size based at least in part on one of a number of transmit antennas and a number of receive antennas.

10. The apparatus of claim 7, wherein the means for determining the bundling size further includes means for determining the bundling size based at least in part on a current transmission rank.

11. The apparatus of claim 7, wherein the means for determining the bundling size further includes means for determining the bundling size based at least in part on a transmission mode.

12. The apparatus of claim 11, wherein the transmission mode includes one of an open-loop transmission mode and a closed-loop transmission mode.

13. A computer-program product for wireless communications, comprising a non-transitory computer readable medium having instructions stored thereon, the instructions being executable by a processor and the instructions comprising:
   instructions for determining, at a base station, a data allocation size from a data region of at least one subframe for a data transmission to a user equipment (UE);
   instructions for signaling the data allocation size to the UE in a downlink assignment;
   instructions for determining a bundling size based at least in part on the data allocation size and a delay spread; and
   instructions for precoding at least one reference signal in bundled contiguous resource blocks of the determined bundling size, wherein the at least one reference signal in each bundle is precoded with a common precoding matrix.

14. A base station for wireless communication, the base station comprising:
   at least one processor configured:
      to determine a data allocation size from a data region of at least one subframe for a data transmission to a user equipment (UE),
      to signal the data allocation size to the UE in a downlink assignment,
      to determine a bundling size based at least in part on the data allocation size and a delay spread, and
      to precode at least one reference signal in bundled contiguous resource blocks of the determined bundling size, wherein the at least one reference signal in each bundle is precoded with a common precoding matrix; and
   a memory coupled to the at least one processor.

15. The base station of claim 14, wherein data in each resource block uses the same precoder as the at least one reference signal.

16. A method for wireless communication, comprising:
   receiving, at a user equipment (UE), a data allocation size determined at a base station from a data region of at least one subframe in a downlink assignment;
   determining a bundling size based at least in part on a delay spread and the data allocation size of data transmitted from the base station in bundles of contiguous resource blocks, wherein at least one reference signal in each bundle is precoded with a common precoding matrix; and estimating at least one precoded channel based on the determined bundling size and one or more reference signals transmitted from the base station.

17. The method of claim 16, further including decoding the received bundles using the estimated precoded channel.

18. The method of claim 16, wherein data in each resource block uses the same precoder as the at least one reference signal.

19. The method of claim 16, wherein the determining further includes determining the bundling size based at least in part on one of a number of transmit antennas and a number of receive antennas.

20. The method of claim 16, wherein the determining further includes determining the bundling size based at least in part on a current transmission rank.

21. The method of claim 16, wherein the determining further includes determining the bundling size based at least in part on a transmission mode.

22. The method of claim 21, wherein the transmission mode comprises at least one of an open-loop transmission mode and a closed-loop transmission mode.

23. An apparatus for wireless communication, comprising:
means for receiving, at a user equipment (UE), a data allocation size determined at a base station from a data region of at least one subframe in a downlink assignment;
means for determining a bundling size based at least in part on a delay spread and the data allocation size of data transmitted from the base station in bundles of contiguous resource blocks, wherein at least one reference signal in each bundle is precoded with a common precoding matrix; and
means for estimating at least one precoded channel based on the determined bundling size and one or more reference signals transmitted from the base station.

24. The apparatus of claim 23, further including means for decoding the received bundles using the estimated precoded channel.

25. The apparatus of claim 23, wherein data in each resource block uses the same precoder as the at least one reference signal.

26. The apparatus of claim 23, wherein the means for determining the bundling size further includes means for determining the bundling size based at least in part on one of a number of transmit antennas and a number of receive antennas.

27. The apparatus of claim 23, wherein the means for determining the bundling size further includes means for determining the bundling size based at least in part on a current transmission rank.

28. The apparatus of claim 23, wherein the means for determining the bundling size further includes means for determining the bundling size based at least in part on a transmission mode.

29. The apparatus of claim 28, wherein the transmission mode includes one of an open-loop transmission mode and a closed-loop transmission mode.

30. A computer-program product for wireless communications, comprising a non-transitory computer readable medium having instructions stored thereon, the instructions being executable by a processor and the instructions comprising:
instructions for receiving, at a user equipment (UE), a data allocation size determined at a base station from a data region of at least one subframe in a downlink assignment;
instructions for determining a bundling size based at least in part on a delay spread and the data allocation size of data transmitted from the base station in bundles of contiguous resource blocks, wherein at least one reference signal in each bundle is precoded with a common precoding matrix; and
instructions for estimating at least one precoded channel based on the determined bundling size and one or more reference signals transmitted from the base station.

31. The computer-program product of claim 30, wherein data in each resource block uses the same precoder as the at least one reference signal.

32. A user equipment (UE) configured for wireless communication, the UE comprising:
at least one processor configured to:
receive a data allocation size determined at a base station from a data region of at least one subframe in a downlink assignment,
determine a bundling size based at least in part on a delay spread and the data allocation size of data transmitted from the base station in bundles of contiguous resource blocks, wherein at least one reference signal in each bundle is precoded with a common precoding matrix, and
to estimate at least one precoded channel based on the determined bundling size and one or more reference signals transmitted from the base station; and
a memory coupled to the at least one processor.

33. The UE of claim 32, wherein the at least one processor is further configured to decode the received bundles using the estimated precoded channel.

34. The UE of claim 32, wherein data in each resource block uses the same precoder as the at least one reference signal.

* * * * *